United States Patent [19]

Ochsner

[11] Patent Number: 4,481,572

[45] Date of Patent: Nov. 6, 1984

[54] MULTICONFIGURAL COMPUTERS UTILIZING A TIME-SHARED BUS

[75] Inventor: Brandt P. Ochsner, Thousand Oaks, Calif.

[73] Assignee: Teledyne Industries, Inc., Northridge, Calif.

[21] Appl. No.: 310,458

[22] Filed: Oct. 13, 1981

[51] Int. Cl.³ .............................................. G06F 15/16
[52] U.S. Cl. ................................................... 364/200
[58] Field of Search ... 364/200 MS File, 900 MS File; 370/85

[56] References Cited

U.S. PATENT DOCUMENTS

| | | | |
|---|---|---|---|
| 3,573,852 | 4/1971 | Watson et al. | 364/200 |
| 3,732,374 | 5/1973 | Rocher et al. | 370/85 |
| 3,978,451 | 8/1976 | Ito et al. | 375/7 |
| 3,993,981 | 11/1976 | Cassarino, Jr. et al. | 364/200 |
| 4,161,786 | 7/1979 | Hopkins et al. | 370/85 |
| 4,164,787 | 8/1979 | Aranguren | 364/200 |
| 4,312,036 | 1/1982 | Porter et al. | 364/200 |

Primary Examiner—Raulfe B. Zache

[57] ABSTRACT

A time-shared bus for use with digital computers. The computers are structured around a high-speed bidirectional time-shared bus, whereby both address and data are carried on the same lines. In a typical configuration, one or more processors, one or more memories and one or more peripheral (I/O) devices are coupled in parallel on the time shared bus, and in addition are each connected by respective control lines to a resource controller. The bus is multiplexed at a relatively high rate, whereby a continuous series of relatively short time slots or windows on the bus are provided. These time slots are selected to be as short as reasonably possible, as required to allow the settling of the bus to each new state as set by the then transmitting unit on the bus and to latch the transmitted information into the receiving unit for that time slot. Each unit on the bus has associated therewith a response time represented by a predetermined number of time slots between its receipt of a request for information and its providing of information onto the bus, which number of time slots delays is resident in both the respective unit controller and in a resource controller. Direct memory access, cache memories and other features are disclosed.

31 Claims, 9 Drawing Figures

MULTICONFIGURAL COMPUTERS UTILIZING A TIME-SHARED BUS

BACKGROUND OF THE INVENTION

1. Field of the Invention

The present invention relates to the field of time shared buses used by digital computers for information transfers.

2. Prior Art

Various types of bus structures for communication between the various elements of a computer system are well known in the prior art. Such structures include both unidirectional and bidirectional structures, and associated protocol, for both synchronous and asynchronous communication. While it would not be appropriate to provide a treatise herein on bus structures, it may be useful to generally describe a specific structure which has been particularly commercially successful and to note certain characteristics and limitations thereof.

In particular, the PDP-11, manufactured by Digital Equipment Corporation (DEC), utilizes a bus structure referred to by DEC as the Unibus, wherein a CPU, memory and peripheral devices are all coupled in parallel on a bidirectional bus. The bus itself is an asynchronous bus comprising a set of bidirectional address lines, a set of bidirectional data lines and a set of control lines. In general, communication between any two units on the bus is achieved in a master-slave relationship, with the unit initiating the communication serving as the master and the other unit serving as the slave. Usually the CPU will be one of the two units in any bus operation, in which case the CPU will take the position of the master, though inherent in the bus structure is a direct memory access capability not involving the CPU.

In a typical bus operation for the Unibus, both the address bus and the data bus are busy throughout most of the time required for the bus operation. By way of specific example, when the CPU addresses memory for an instruction or for an operand, the CPU seizes the bus and asserts the memory address and control signals thereon. The bus will remain tied up until the address is decoded, the data at the decoded location is placed on the bus and is received by the CPU. Consequently, even though separate address and data busses are provided, time sharing of the busses with other units is substantially impossible. Further, because the bus is tied up not only during the address and data communication times, but also throughout the memory (or other unit) cycle, bus operations may be relatively slow dependent upon the speed of the units on the bus. This is not to say that the bus does not have certain advantages, particularly with respect to its flexibility with respect to both hardware and software, though for the foregoing reasons, speed is not one of its greater assets.

Also in recent years there has been an increasing interest in multiprocessing wherein two or more central processing units are coupled to the same bus so that each processing unit will have access to all the other units on the bus, whereby the processing load may be shared or distributed between the processing units. It is clear that in such applications, many prior art bus structures such as the Unibus hereinbefore described are not appropriate for such multiprocessing applications, as a single processor normally ties up the bus most of the time, preventing any substantial gain by placing a second processor thereon. It is clear therefore, that a highly efficient bus structure is required if true multiprocessing with two or more processors on the same bus structure is to be achieved.

In addition to the foregoing, there has recently been increased emphasis on low cost and fault tolerant computer designs. In that regard, the number of bus lines required within a particular computer has a significant effect on the cost of the computer, as it grossly affects the cost and complexitiy of the backplane thereof and generally is reflected in an overall parts count for the computer. The number of lines has an even greater effect on the reliability of a computer, as connector contact failures are a common source of failure, and numerous contacts to each bus line are required in substantially all computer systems.

BRIEF SUMMARY OF THE INVENTION

Multiconfigural computers having a time-shared bus are disclosed. The computers are structured around a high-speed bidirectional time-shared bus, whereby both address and data are carried on the same lines. In a typical configuration, one or more processors, one or more memories and one or more peripheral (I/O) devices are coupled in parallel on the time shared bus, and in addition are each connected by respective control lines to a resource controller. The bus is multiplexed at a relatively high rate, whereby a continuous series of relatively short time slots or windows on the bus are provided. These time slots are selected to be as short as reasonably possible, as required to allow the settling of the bus to each new state as set by the then transmitting unit on the bus and to latch the transmitted information into the receiving unit for that time slot. Each unit on the bus has associated therewith a response time represented by a predetermined number of time slots between its receipt of a request for information and its providing of information onto the bus, which number of time slots delays is resident in both the respective unit controller and in a resource controller. In this manner, the resource controller may act as the traffic controller, providing access to the bus by the various units thereon on a priority basis and assigning of time slots in accordance with the predetermined delay of units gaining bus access while still allowing the interleaving of other bus operations as the priorities, the availability of other units on the bus and the delay times associated therewith allow.

DETAILED DESCRIPTION OF THE INVENTION

One of the underlying concepts of the present invention may be best understood by first considering the characteristics of a basic bus operation. For purposes of this explanation, a typical memory operation will be described wherein the central processing unit is fetching data from a medium speed memory. Regardless of the specific structure of the bus, certain basic functions must somehow be accomplished for a successful fetch. In particular, the central processing unit must communicate the memory address at which the desired data resides to the memory over the bus. In addition, at the same time the memory must somehow be instructed to respond to the address, a function which is accomplished in different ways in various bus structures. By way of example, in certain systems this is done by a separate control line, whereas in the PDP-11 computers the address itself directs the memory to respond in that no two units on the bus have the same address or overlapping sets of addresses, so that any unit on the bus will respond if and only if addressed within its respective address range. In any event, a typical processer can put an address out on the bus quickly and, of course, the memory can latch the address into its address register quite quickly also. However, the memory cannot immediately respond upon receiving the address, as the address must first be decoded before the specific memory address can be accessed. Consequently, while the address and request from the CPU may be received by the memory quite quickly, the memory will not be prepared to respond with the requested data, i.e., put the requested data out on the bus for receipt by the CPU until sometime thereafter. Obviously, once the memory address has been decoded and the desired memory locations accessed, then the accessed data will be put on the bus by the memory for receipt by the CPU. This second communication, i.e., the communication of data from memory to the CPU, once initiated, is also relatively fast. Consequently, it may be seen that the only essential times for the bus to be tied up is in the initial transfer of the desired memory address from the CPU to the memory, and the subsequent transfer of data from the memory to the CPU. This is in comparison to many prior art systems wherein the bus is in fact tied up not only during these two communications but also while the address is being decoded, the memory locations accessed, etc.

Figure 1:
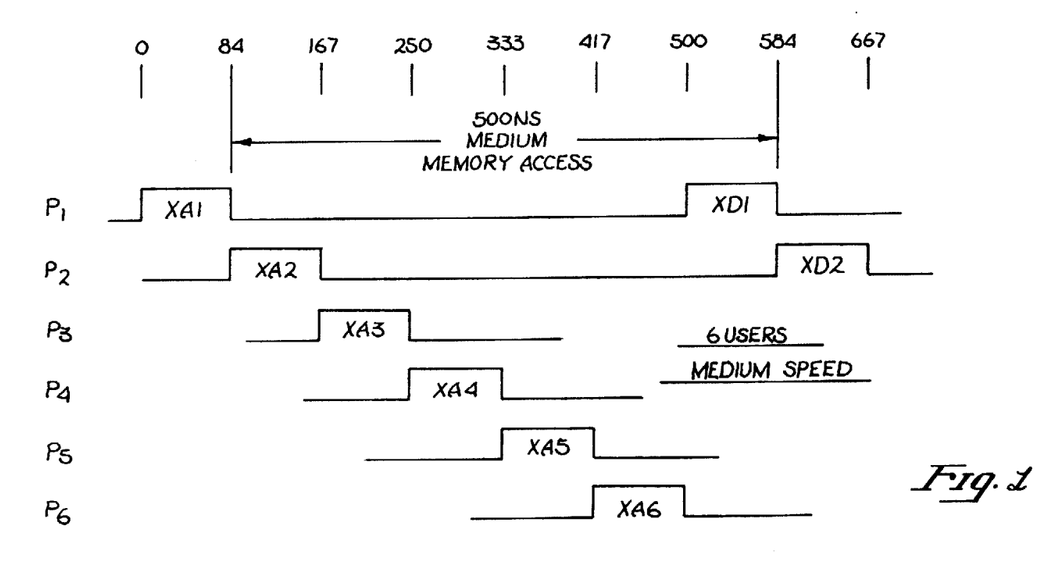
FIG. 1 is a timing diagram illustrating the time division multiplexing of both address and data for a plurality of processors on a single time shared bus in accordance with the present invention.

The foregoing is illustrated in FIG. 1. In that Figure, it is presumed that processor P1 transmits the memory address (XA1) on the bus and that that address is latched into the memory address register within an 84 nanosecond time slot or window. It is also presumed in that Figure that the decoding of the address, accessing the memory and being prepared to present the accessed data onto the bus requires an additional five 84 nanosecond time slots. Thereafter, however, as previously described, only one additional time slot is required to transmit the data (XD1) from the memory back to the processor P1. Thus, it may be seen that during the first 500 nanoseconds (six 84 nanosecond time slots) the bus need only be utilized for one of the six time slots. Consequently, the remaining five time slots could be used, by way of example, in a multiprocessing application by five additional processors P2 through P6 without slowing any of the bus communications. Further, it will be noted that in the foregoing example, address and data are never present on the bus at the same time, so that the same bus lines may be used for both address and data. It is this form of time shared multiplexing which is used in the present invention.

In the foregoing example, an ordinary memory operation was described. Normally, particularly in computer systems used in scientific applications, most of the bus operations are memory fetch and store operations as opposed to I/O or other bus operations. It should be recognized, however, that the same principles apply with respect to I/O operations, though the number of time slots between the address and data signals may vary substantially dependant upon the nature of the operation (i.e., input versus output) and the initiation factor (i.e., I/O interrupt versus a CPU request to a peripheral to obtain and respond with data).

Figure 2:
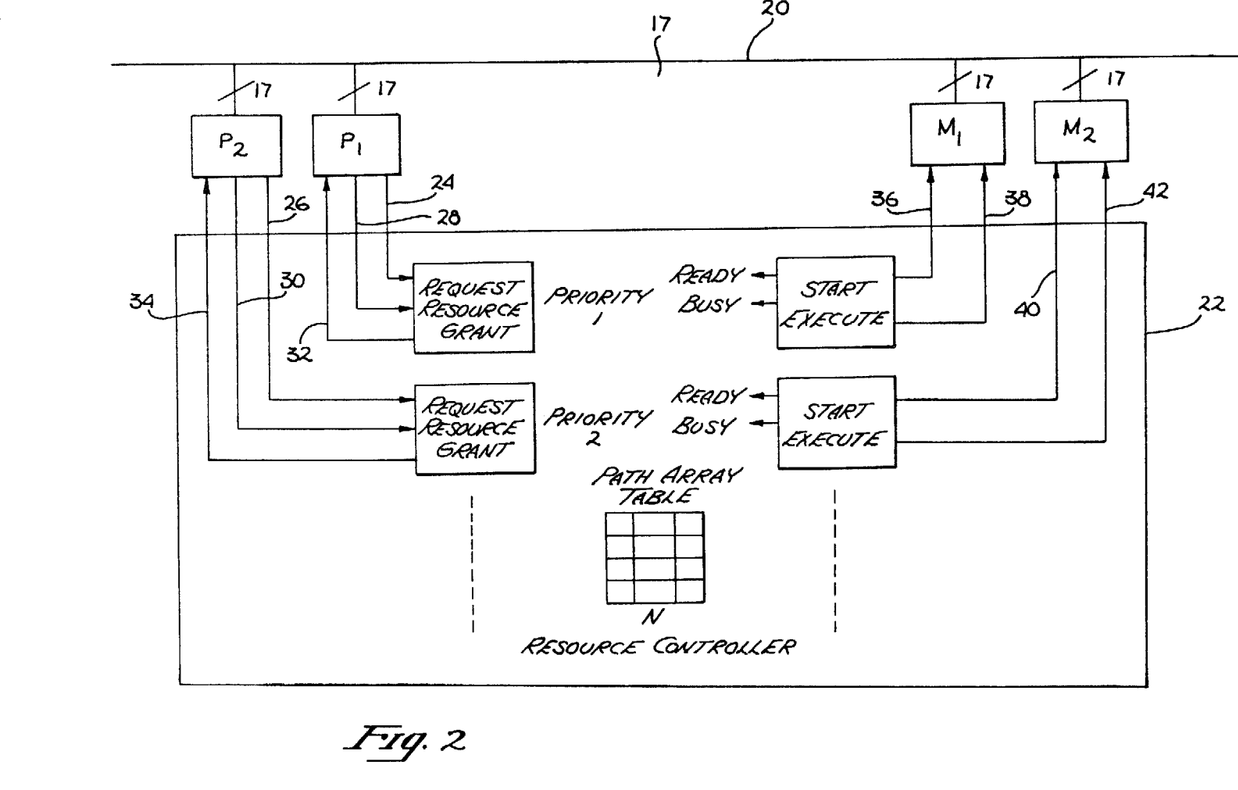
FIG. 2 is a block diagram illustrating part of a system comprising two processors and two memories on a common bus controlled by a single resource controller.

Now referring to FIG. 2, a block diagram of a time shared multiplexed bus together with the processor and memory portion of a multiprocessor system, specifically a system having two processors and two memories, may be seen. In this diagram it is presumed that the processors P1 and P2 are each 16 bit processors having a 16 bit addressing capability. With these processors the time shared multiplexed bus 20 would nominally be a 16 line bus, though it is preferable to use at least one extra line to provide a mode control signal to control such things as fetch versus store for a memory operation, and input versus output for I/O operations.

With the connection shown in FIG. 2, each of the two processors P1 and P2 may communicate with each of the memories M1 and M2 (albeit not at the same time), even though the memories M1 and M2 are conventional single port memories. The communication on the bus 20 is controlled by a resource controller 22 which responds to various requests and unit status signals to control the traffic on the bus. In particular, it will be noted in FIG. 2 that each of the processors P1 and P2 can provide a bus request signal on lines 24 and 26, respectively, to the resource controller. In addition, each of the processors P1 and P2 provide an identification code of the specific resource being requested on lines 28 and 30, respectively. In general the bus request lines 24 and 26 are single line lines, whereas lines 28 and 30 are each multi-line lines, the number of which depend upon the maximum number of resources which may be identified or requested in any specific system using that resource controller, and whether the resource identification is a coded or uncoded identification. Normally, a coded identification will be used so that the number of lines used for each of lines 28 and 30 is relatively small, particularly when compared with bus 20. In addition, each of the processors P1 and P2 respond to signals on lines 32 and 34 respectively, from the resource controller 22 indicating that the previous bus request for the resource identified in conjunction with the previous bus request has been granted. Obviously, since the resource controller, processors, memories and any other units on the bus 20 communicate synchronously, a clock reference is provided to all of the foregoing units for sync purposes.

It will be noted from the foregoing, that the resource being requested by the processors is identified not by the resource address or address range, but instead is identified by the signals on lines 28 and 30. Consequently, the memories M1 and M2 or any other units (resources) on the bus 20 may have overlapping or even coterminous addresses, i.e., memory unit M1 and memory unit M2 may be identical memory units. Consequently, the 16 bit addressing capability of processors P1 and P2 does not limit the memory access to 64K bytes of memory, but instead, a larger addressing capability may be readily incorporated dependent upon the number of memory units coupled to the bus 20 without requiring multiplexing of the address itself, i.e., requiring two successive 16 bit address words to the memory.

Referring again to FIG. 2, it may be seen that each memory unit M1 and M2 (and peripheral units not shown) are coupled to the resource controller and are each responsive to start and execute signals supplied thereto by the controller. In particular, Memory M1 is responsive to a start signal on line 36 to latch an address on bus 20 into its address register and to proceed with the decoding thereof. Memory M1 is also responsive to an execute signal on line 38 for putting the accessed data onto the bus 20 during a fetch operation, or to receive data from bus 20 and to store the data at the addressed location during a store operation, dependent upon the mode (read or write) as determined by the state of the mode control line or lines. (Sometimes more than one line is used to identify left or right byte versus full 16 bit word transfers as well as read versus write operations). Similarly Memory M2 is responsive to start and execute signals on lines 40 and 42 respectively.

Referring for the moment back to FIG. 1, it will be recalled that a time delay of a typical unit on a bus such as the delay required by a medium speed memory could be expressed in terms of a number of bus time slots before the memory was prepared to put data on the bus in a fetch (read) operation, or to receive data from the bus in a store (write) operation. At certain times, even with the multiplexing and time sharing of the present invention, the bus will not be busy, the amount of such time depending upon the particular configuration of, and program being executed by, the multiconfigurable system. By way of specific example, if processors P1 and P2 (see FIGS. 1 and 2) are the only processors on the bus and both are in the process of accessing medium speed memories, it will be seen that at least at that time, the bus will still be idle most of the time, even though both data and address for both processors and memories are time shared multiplexed on the same bus. Accordingly, because of this fact and the fact that the resource controller may be made to operate at very high speeds, the preferred embodiment of the invention operates with a resource controller running at twice the speed of the typical 84 nanosecond bus operation of that embodiment. Stated another way, the resource controller is clocked at twice the rate of the bus operations themselves, so that when a bus is available, a bus operation may be initiated at any 42 nanosecond clock (even though the bus operation will continue for two such clock times) rather than to have to wait for the next 84 nanosecond clock pulse. Thus, in the preferred embodiment, the memory delay times are expressed in terms of the number of half time slots or bus cycles so that the memories may be operated at the highest speeds practical.

The delay of each of Memories M1 and M2 in terms of the number of 42 nanosecond increments is a predetermined characteristic of memories M1 and M2, and generally will be hard wired into the resource controller 22, as that delay is generally a design constrained invariant delay. Associated with that delay for each memory is a signal directly or indirectly generated within the resource controller to indicate when the memory is ready to read or write, i.e., decoding and memory access is complete. In the meantime, and until the memory cycle in process is completed, which may occur one or more cycles after the memory is ready to execute, a busy signal is directly or indirectly generated within the resource controller to prevent a further attempted access to the same memory until the earlier memory cycle is completed.

Figure 3:
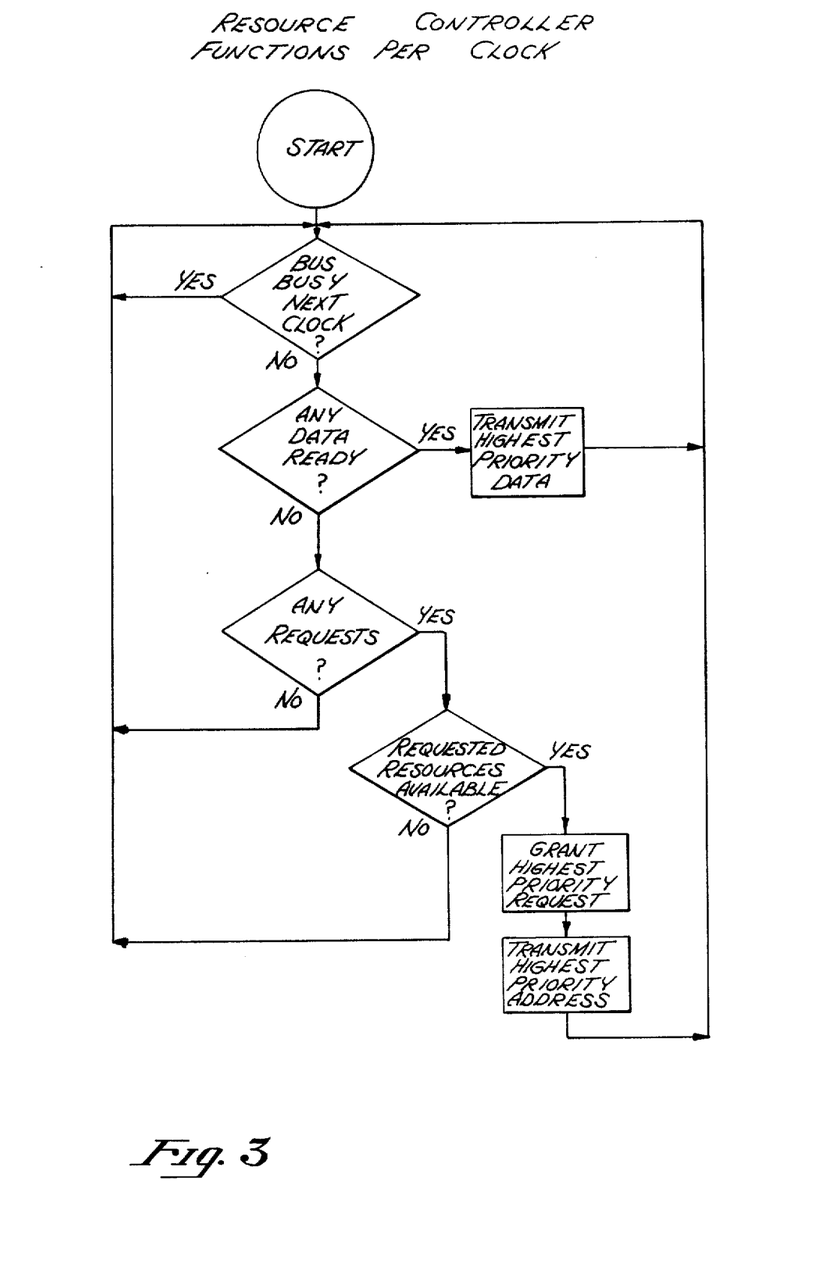
FIG. 3 is a logic flow diagram for the resource controller functions per clock cycle, preferably realized in program logic array form.

Now referring to FIG. 3, a logic flow diagram illustrating the functional logic of the resource controller may be seen. At the start of any 42 nanosecond time period, the resource controller first determines whether or not the bus will be busy during the next 42 nanosecond time period. If a bus operation had just been initiated in the preferred embodiment, that operation will continue for two 42 nanosecond periods, so that the bus will be busy during the next 42 nanosecond clock. The busy signal (FIG. 2) for any particular memory will be dropped after the appropriate interval required for that memory (but always at the beginning of each 42 nanosecond clock). Hence, the memory will not indicate that it will be busy at the next 42 nanosecond clock occuring at the end of its desired execution cycle. If any of the resources are transmitting or being transmitted to, such that the bus will be busy at the next 42 nanosecond clock, the resource controller merely waits for the next 42 nanosecond clock and restarts the resource controller function. If, on the other hand, the bus will not be busy at the next 42 nanosecond clock, the resource controller checks the ready signals to see if the requested resources are ready to execute. If they are, the highest priority requesting CPU (or other device) is obtained from a previously stored entry in a look up table and the resource and associated requesting device are enabled to seize the bus at the next 42 nanosecond clock signal. In general, priorities will not normally be assigned and/or associated with ready devices, as all ready devices will be serviced in sequence before new bus communications are initiated, i.e., unless there are reasons otherwise in a specific system, normally ready devices as a group will be given priority over requesting devices. If, on the other hand, no resources are ready, the resource controller will search for any unchecked bus request, and on finding an unchecked request, will select the highest priority unchecked request to determine if the requested resource is available. Here again, generally a resource in cycle will be given priority over the highest priority request, as that resource will execute and thereafter be available within a very few 42 nanosecond clock cycles thereafter. If the requested resource is available, the requester and resource are enabled to seize the bus at the next 42 nanosecond clock pulse, and at the same time (not shown in FIG. 3) the requester resource combination identification is stored in a path array table in the resource controller so that the requester may be associated with the requested resource when the resource is ready for the subsequent communication.

If the highest priority request is for a resource which is not available, the next highest priority request is similarly checked, etc., until either a requester-available resource combination is found, or until all requesting devices are checked, after which the resource controller waits for the next 42 nanosecond pulse to reinitiate the resource controller sequence. Thus, in the preferred embodiment, ready resources are given priority over the request of CPUs (and any other requesting devices) without any priorities as between ready devices. Priorities are given however, to requesting devices, with bus access being achieved for the highest priority requesting device requesting an available resource. Obviously, this hierarchy of service and priorities may be altered if desired, though for most applications, the ones described are preferred.

The diagram of FIG. 3 is a logic flow diagram, suggesting that the functions are done under software control, though software control generally could not be achieved within the 42 nanosecond time period indicated. The resource controller however, is a hard wired device which may be made to operate very fast, as most of its electronic functions are simple gating functions which require only the ripple through of the conditions set at one clock pulse before the arrival of the next clock pulse.

Figure 4:
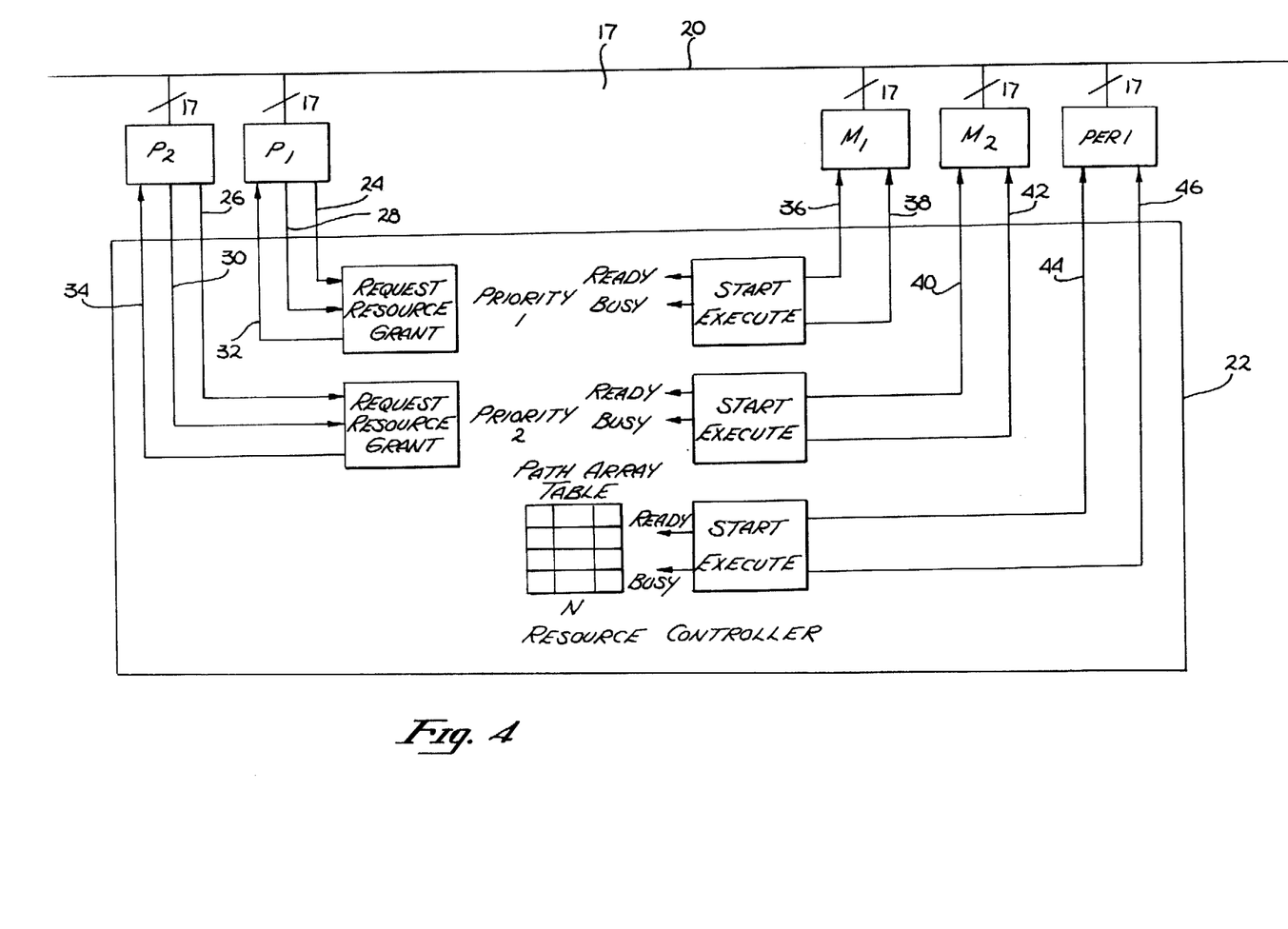
FIG. 4 is a block diagram similar to FIG. 2, though further illustrating the connection and control of a peripheral device having a predetermined maximum access delay.
Figure 5:
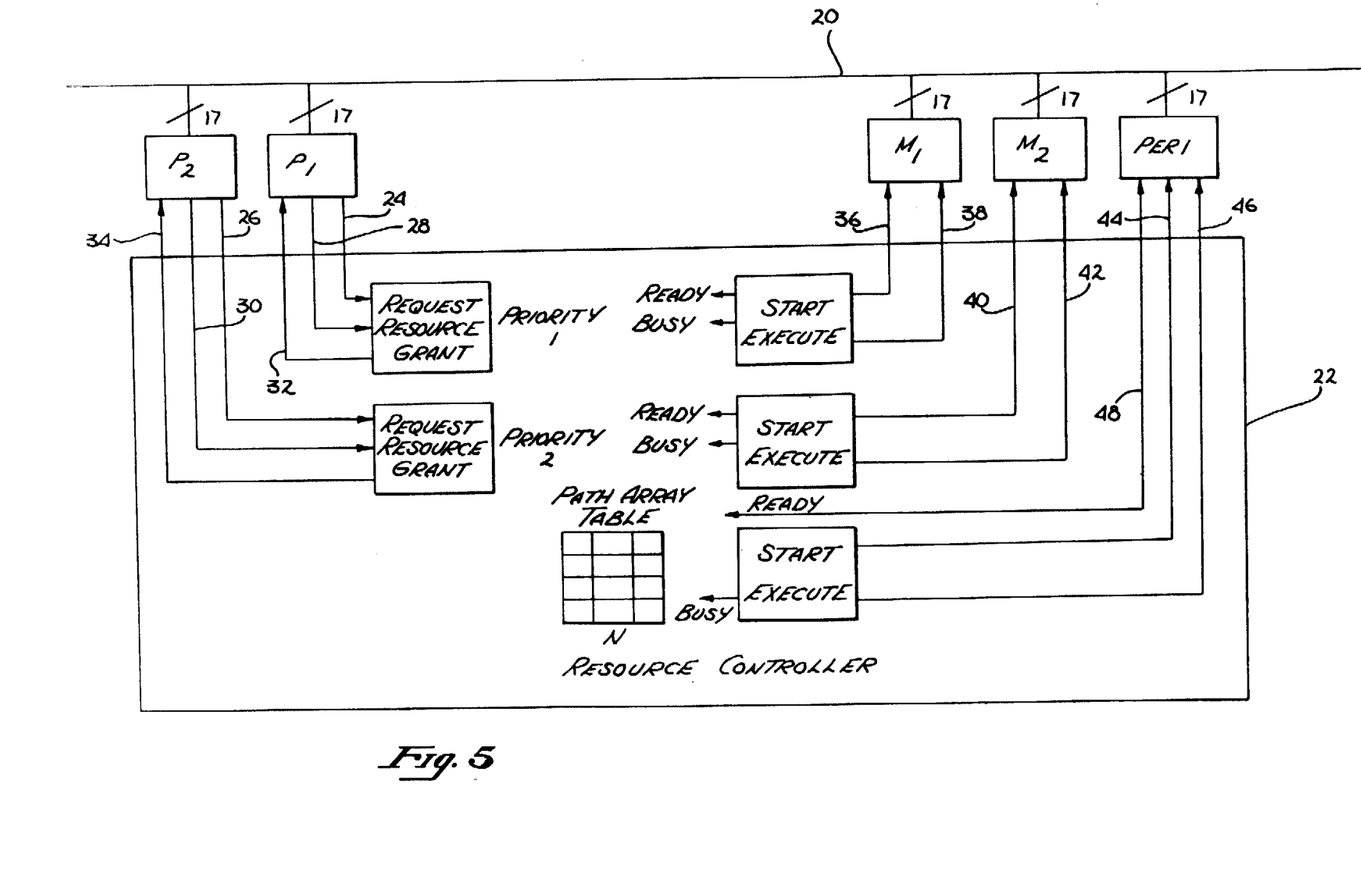
FIG. 5 is a block diagram similar to FIG. 4, illustrating the connection and control of a peripheral device having a variable access delay.

In the previous description, it was pointed out that peripheral devices such as I/O and other devices may readily operate in exactly the same manner as was described in detail for Memories M1 and M2. This is illustrated in FIG. 4, wherein peripheral PER1 is coupled to start and execute lines 44 and 46, with busy and ready signals or their equivalents being internally generated in the resource controller based upon the previously determined operating cycle of the peripheral device. In certain instances however, a peripheral device may have a time variant operating cycle, wherein the required delay between the start and the execute operation may vary substantially based on one or more factors. By way of example, disc operations (writing specific data to a disc or reading specific data from a disc) depend in part upon the exact disc position when the operation is initiated. Obviously in this example there is some maximum delay which could be used for the delay time of the device, though most disc operations will take substantially less than that maximum time. In such instances it may be desirable to allow for a variable time delay by having the ready signal or its equivalent of FIGS. 3 and 4 for that peripheral device be generated by the peripheral device itself based upon its actual state of readiness, rather than by using a predetermined longer maximum operating time of the device. This is illustrated in FIG. 5 wherein the ready signal on line 48 comes directly from the peripheral PER1 rather than being generated by the resource controller 22 by predetermined information regarding the operation of the peripheral device.

The bus structure herein described is particularly useful, not only because of its speed, but also because of its flexibility in that the differences between systems of substantially different configurations are substantially entirely within the resource controller itself rather than the individual functional elements (central processing units, memories, etc.) Further, the resource controller in the preferred embodiment utilizes a program logic array for implementation of the logic flow diagram of FIG. 3 so that changes in the resource controller can be made without a major resource controller redesign effort.

Figure 6:
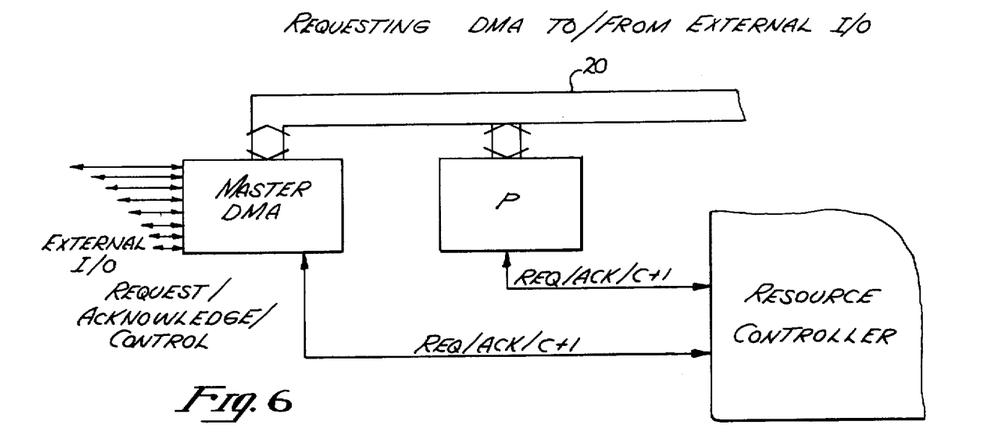
FIG. 6 is a block diagram illustrating the connection and control of a master direct memory access device in the system of the present invention.

An example of the flexibility of the present invention is the manner in which direct memory access may be achieved and the unique method of incorporating one or more instruction look ahead memories or cache memories in the system. In particular, in most systems a direct memory access function is required for the fast block transfer of information between peripheral devices and main memory. This is easily achieved with the present invention by merely coupling a direct memory access requester onto the bus for control by the resource controller. This is illustrated in FIG. 6 wherein part of a system comprising a processor, a resource controller and a master DMA unit all coupled to the bus 20 may be seen. The usual system approach for the present invention is to provide one centralized master DMA requester with eight or more prioritized subrequesters as inputs to the master. The master DMA controller is then given the highest priority of all requesters to enable the best response from the resource controller. As such, the master DMA unit merely appears to the resource controller as another requester much like any processor on the system, albeit a high priority requester, with the request, acknowledge and control signals to the master DMA serving the same functions as hereinbefore described with respect to the processors on the system.

Typically the direct memory access function, as such, is provided to read and write memory data to and from the world completely external to the computer without the time consuming transfers to and from processor registers, as depicted in the simple configuration of FIG. 6 showing eight external I/O ports. However the use of the DMA master as a top priority asynchronous requester in the systems of the present invention enables a novel method to easily connect one or more instruction look ahead memories (cache memories), such as one for each processor in a dual processor system. This is shown in part in FIG. 7 wherein cache memories C1 and C2, for processors P1 and P2 respectively, are included in the resource controller. The cache memories in this implementation provide a method for increasing the speed of each processor by means of prefetching the instructions through the DMA. One basic advantage of this approach is that it can be added to the resource controller design with no modification of existing processor modules. Preferably, to take maximum advantage of the cache memories one should have (i) a fast DMA capability, preferably the capability to access within one memory cycle, (ii) asynchronous real time response of processors to variable access delay memories, (iii) memory default routing control, i.e., to access cache, if not empty, and main memory if the cache is empty, and (iv) a resource code signal denoting a processor instruction fetch.

Figure 7:
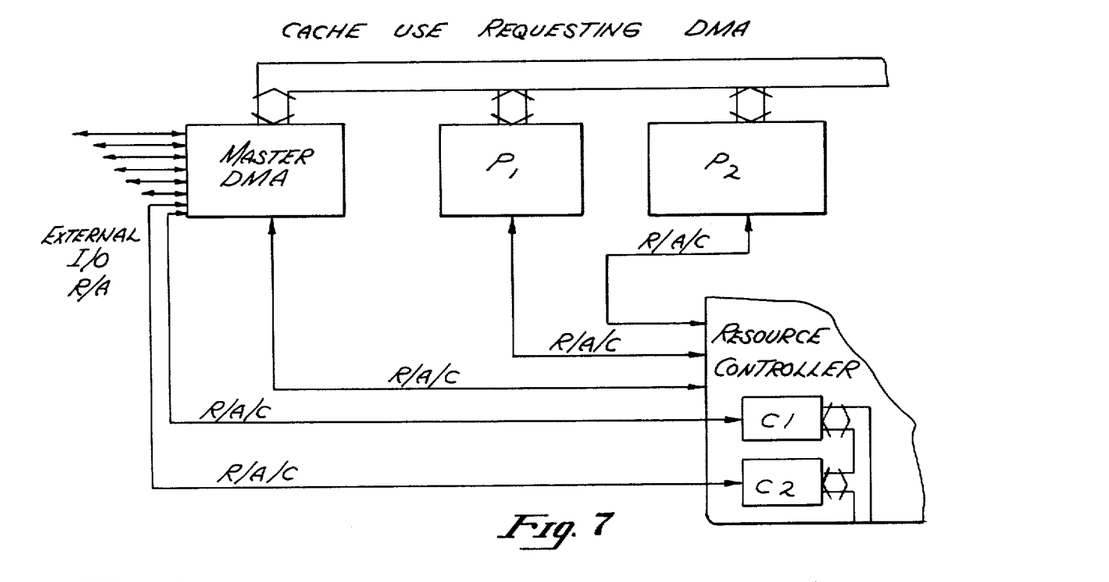
FIG. 7 is a block diagram illustrating the connection and control of a master direct memory access device and cache memories in a system in accordance with the present invention.
Figure 8:
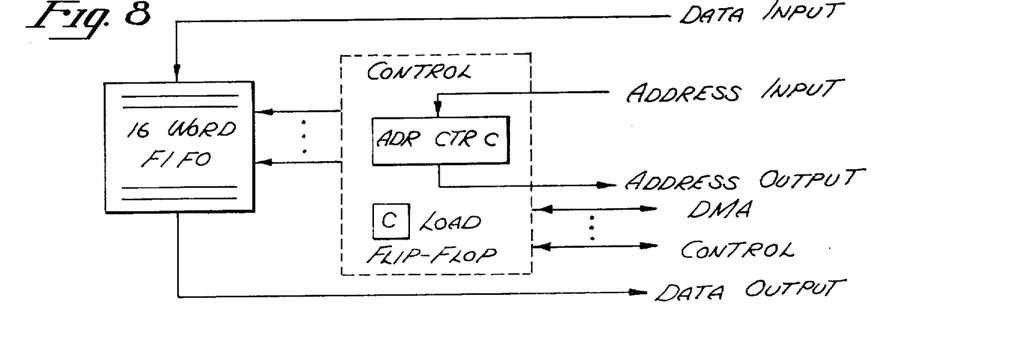
FIG. 8 is a block diagram illustrating one embodiment of cache memory which may be used with the present invention.

The preferred apparatus for this form of cache memory is a fast access multiword first in first out (FIFO) as a real time alternative instruction memory. This is illustrated in FIG. 8 which is a block diagram of a typical cache memory such as the memories C1 and C2 of FIG. 7. This memory is able to stack instructions in look ahead mode in order to save time spent accessing main memory, normally operated on an as needed basis. One aspect of the novelty of this approach lies in the use of existing DMA features of the fast time shared bus to provide input to the FIFO. For purposes of controlling the DMA, a full address range 16 bit counter is provided with each FIFO. A C load flipflop is used to record the initial loading of the address counter. In this specific example shown in FIG. 8, a 16 word FIFO is used. In that regard the usual built in functions in standard off the shelf FIFOs are assumed, i.e., such as those characteristic of the 9403 FIFO manufactured by Fairchild Semiconductor.

Logical control of the mechanism may be kept very simple while retaining most of the speed up benefits. This control is defined by (i) the general instruction fetch via the resource controller, where the decision is made to either access the requested memory or default access the nonempty FIFO, and (ii) the FIFO initialization and DMA loading interface. For the instruction fetch request, if there is an instruction fetch and the FIFO is empty, the address counter is strobed with the address, the C flipflop is set and the fetch proceeds by going to main memory in the normal fetch mode. Under these conditions the access delay is the delay of the main memory. If on the other hand there is an instruction fetch and the FIFO is not empty, the fetch will be completed by going to the FIFO memory in the default mode, wherein the access delay is reduced to the access delay of the FIFO, much shorter than the access delay of main memory.

For the FIFO initialization and DMA loading, the following procedure is carried out. If the C flipflop is set and the FIFO is not full, then the address counter (in the cache memory) is incremented and a direct memory access operation is executed to load another (sequential) instruction into the FIFO. Obviously in this case the access delay is the access delay of main memory, as the main memory is in fact accessed to load the FIFO. If the C flipflop is set and the FIFO is full, then nothing is to be done. If the instruction being executed is a branch or skip instruction, then the FIFO is reset, i.e., cleared of all entries and the C flipflop is reset also. Finally, on power on reset, the FIFO and C flipflop are also reset.

The advantages of using a fast local memory in the form of a cache are well known to those skilled in the art. The effective speed up of computer operation depends upon the ratio of main memory speed to cache memory speed, the statistical distribution and the extent of branch outs within the executed program, and the degree of conflict within the mechanism for loading and accessing the cache. This latter factor (load and access) is specifically enhanced by the present invention. In particular, the present invention provides simplified access of the cache to main memory via DMA with very fast response, since time multiplexed interleaving of multiuser address and data transmissions are permitted. Further, the ability to organize the memory into a plurality of blocks of arbitrary size, each of which may be cycled concurrently enables the cache to cycle a program memory block while its using processor is concurrently cycling an operand memory block. This feature is merely a specific use of the more general multiprocessing capability of the invention. In that regard, obviously the system of the present invention utilizing a cache memory will provide enhanced speed of the system even in single processor applications because of the interleaving as hereinbefore described.

Access to the loaded cache by the using processor is naturally provided by the resource controller, designed to essentially identify requested resources and determine which tristate drivers to enable based upon states of busy, access delay and conditions of empty or nonempty local caches. Since the DMA operation to load each of the cache memories is a bus operation, albeit a high speed bus operation, the cache memories have certain characteristics of the generalized requesting resources and accordingly, these operations generally also must have a priority relative to the generalized requesting resources. In that regard, the cache memories are of primary effect only in systems which otherwise would have a bus which was free a substantial amount of time, which available time could be utilized to keep the cache memories loaded and to handle the increased bus congestion arising from the fact that the system will be executing more instructions per unit of time because of the speed up effect of the cache memories. Accordingly, generally speaking, the loading of the cache memories may be given a priority below the generalized requesters, with the cache memory on the highest priority processor getting the highest priority of the cache memories, etc. On the other hand, there may be instances where the speed of the processor having the highest priority is of paramount interest, in which case the loading of the cache memory for the highest priority processor might be given priority over certain other processors. For that matter, perhaps less than all of the processors in the multiprocessing system may have cache memories thereon, dependent upon the overall system requirements. One of the advantages, of course, of placing the cache memories in the resource controller is that it substantially concentrates all differences between different systems in the resource controller and the program logic array therein, as opposed to requiring differences in the processors, memories, I/O devices, etc. as would be characteristic of most systems. The use of the state of the art progammable logic array (PLA) devices within the resource controller makes the control function readily achievable with relatively few devices.

Figure 9:
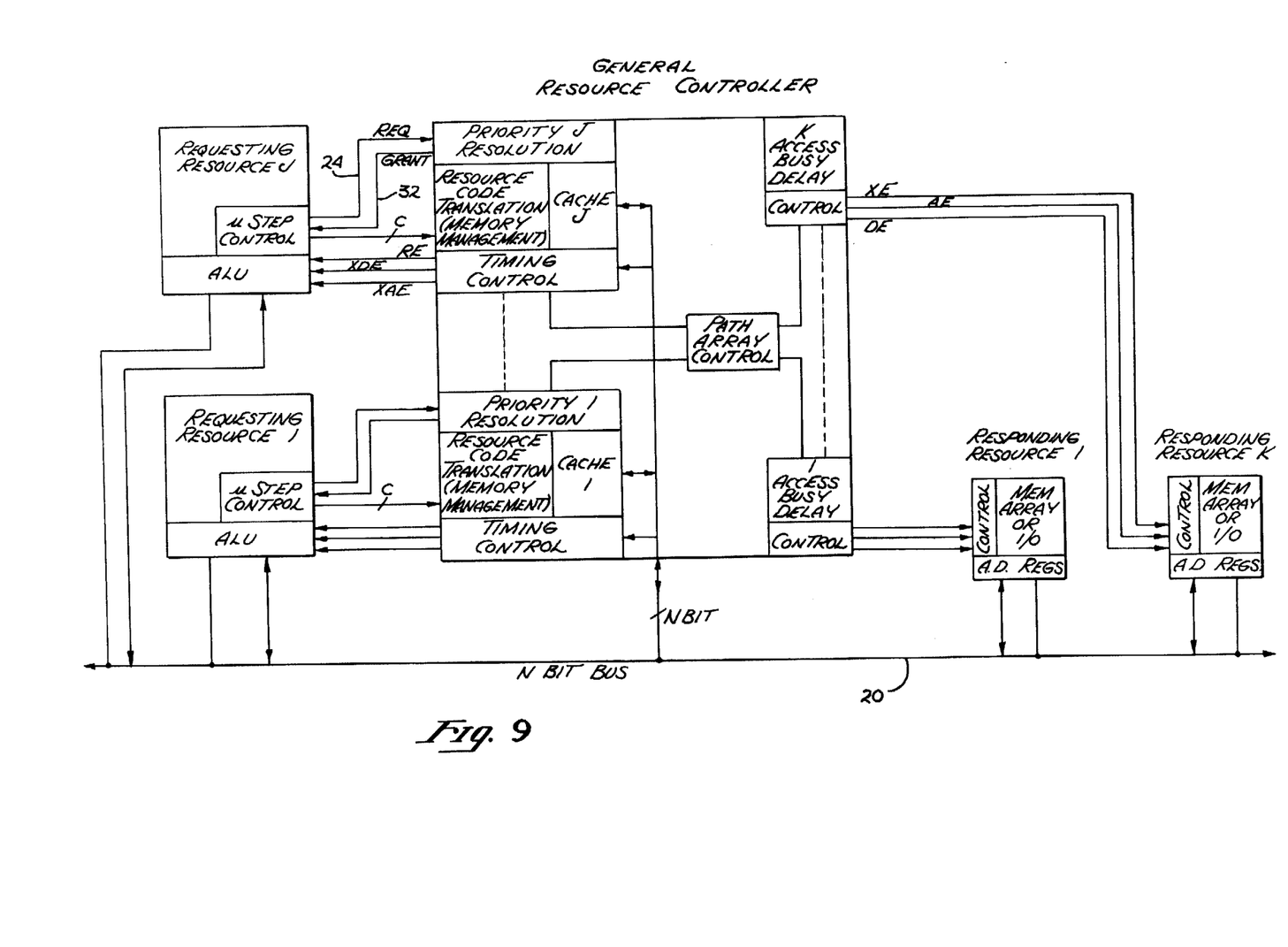
FIG. 9 is a block diagram illustrating a generalized resource controller coupled to requesting resources 1 through J and responding resources 1 through K.

A generalized resource controller and various resources are shown in block diagram form in FIG. 9. In this figure, the resource controller is coupled to requesting resources 1 through J and responding resources 1 through K. While the requesting resources are shown as having arithmetic logic units (ALUs), one of the requesting resources may readily be a master DMA unit as shown in FIGS. 6 and 7. In FIG. 9, each of the requesting resources are coupled to the resource controller through a plurality of lines. In particular, as hereinbefore described, each requesting resource will provide a request to the resource controller on a single line, together with a code identifying the requested resource on a plurality of lines, the number of lines depending upon the maximum number of resources to be requested in the system. A grant signal is received by each requesting resource through a grant line based upon a priority resolution within the resource controller. The timing control within the resource controller provides transmit data enable, transmit address enable and receive enable signals for controlling the requesting resource based upon the control of the path array control and the control and access, busy, delay control of the responding resources. Similarly, the responding resources are also responsive to address enable, data enable and transmit enable signals to receive address and data from the bus 20 and/or provide information back on the bus (i.e., transmit enable) to be received by the requesting resource (in response to the receive enable signal provided thereto). The cache memories in the resource controller of course are also coupled to the bus 20, with each respective cache and timing control noting whether or not the requested instruction is in the cache so that the fetch operation can be completed through the cache under the control of the path array control much faster than if main memory had to be accessed.

There has been described herein various forms of multiconfigural computers utilizing a time shared bus. The use of the time shared bus in conjunction with a central resource controller for all of the functional elements on the bus allows the realization of single processor systems, single processor systems with direct memory access capabilities, single processor systems with cache memory and direct memory access, multiprocessor systems with and without cache memory and with and without direct memory access, and systems with expanded memory capabilities, without expansion of the time shared bus itself, all by varying the resource controller, particularly in the program logic array controlling the various devices without change in the processor, memory, bus or I/O interfaces used in any of these systems. While certain preferred embodiments of the present invention have been disclosed and described herein, it will be understood by those skilled in the art that various changes in form and detail may be made therein without departing from the spirit and scope of the invention.

I claim:

1. In a computer system, the improvement comprising
    a time-shared bidirectional multiplexed bus, said bus having a first plurality of lines for carrying addresses, instructions and data in a time division multiplexed operation
    a plurality of units coupled in parallel to said bus for communication therebetween over said bus lines, said plurality of units including at least one processor unit and at least one memory unit, each said processor unit having a relative priority in the system, each said processor unit further including request means for requesting access to said bus for communication thereover to another specific unit coupled to said bus, each said memory unit having a predetermined access time associated with memory operations dependent upon the time within which memory read and write cycles will be completed by said memory units, and
    a resource controller, said resource controller being coupled to each said processor and each said memory unit, said resource controller being responsive to bus access requests from each said processor to grant bus access thereto for initiation of a memory operation with one said memory unit, said resource controller further having means for retaining said predetermined access times associated with each said memory unit to withhold a subsequent bus grant for initiation of a subsequent memory operation for any said memory unit until the respective said predetermined access time has expired since initiation of a prior memory operation and
    wherein said time division multiplexing of said bus occurs during the time between placing an address on said bus and placing data associated with said address on said bus.

2. The improvement of claim 1 wherein said resource controller further comprises means for granting bus access for completion of a previously initiated memory operation after said predetermined access time for the particular said memory unit has expired.

3. The improvement of claim 2 wherein said resource controller further comprises means for withholding a subsequent bus grant for initiation of a subsequent memory operation for any said memory unit until the previously initiated memory operation for the respective said memory unit has been completed.

4. The improvement of claim 3 further comprised of a direct memory access unit coupled to said bus and said resource controller.

5. The improvement of claim 4 wherein said direct memory access unit includes request means for requesting access to said bus for communication thereover to a particular said memory unit, said direct memory access unit being a means for directly communicating with the particular said memory unit when given bus access by said resource controller.

6. The improvement of claim 5 wherein said direct memory access unit includes at least one port for communication with the outside world.

7. The improvement of claim 5 further comprised of a high speed look-ahead cache memory for each said memory unit, each said look-ahead cache memory being coupled to said bus and said direct memory access unit, said direct memory access unit being a means for accessing one said memory unit and loading a plurality of look-ahead instructions into a respective said cache memory when granted bus access.

8. The improvement of claim 1 wherein said plurality of units includes a plurality of processor units.

9. The improvement of claim 8 wherein said resource controller includes means for granting bus requests in the order of the priority of the requesting unit.

10. The improvement of claim 1 wherein said plurality of units includes a plurality of memory units.

11. The improvement of claim 1 wherein said bus is further comprised of a read/write line, whereby a unit gaining control of the bus may identify the nature of the memory operation to be carried out by the signal applied to said read/write line.

12. In a computer system, the improvement comprising
    a time-shared bidirectional multiplexed bus, said bus having a first plurality of lines for carrying addresses, instructions and data in a time division mutiplexed operation utilizing a continuous stream of fixed duration time slots, whereby an address, an instruction or data may be transmitted on the bus during any one time slot
    a plurality of units coupled in parallel to said bus for communication therebetween over said bus lines, said plurality of units including at least one processor unit and at least one memory unit, each said processor unit having a relative priority in the system, each said processor unit further including request means for requesting access to said bus for communication thereover to another specific unit coupled to said bus, each said memory unit having a predetermined access time associated with memory operations dependent upon the time within which memory read and write cycles will be completed by said memory units, said plurality of units also including a direct memory access unit, said direct memory access unit having request means for requesting access to said bus for communication thereover to a particular said memory unit, said direct memory access unit also having a relative priority in the system and being a means for directly communicating with the particular said memory unit when given bus access by a resource controller coupled to each said processor and each said memory unit, said resource controller being responsive to bus access requests from each said processor to grant bus access thereto for initiation of a memory operation with one said memory unit, said resource controller further having means for retaining said predetermined access times associated with each said memory unit to withhold a subsequent bus grant for initiation of a subsequent memory operation for any said memory unit until the respective said predetermined access time has expired since initiation of a prior memory operation wherein said time division multiplexing of said bus occurs during the time between placing an address on said bus and placing data associated with said address on said bus.

13. The improvement of claim 12 wherein said resource controller further comprises means for granting bus access for completion of a previously initiated memory operation after said predetermined access time for the particular said memory unit has expired.

14. The improvement of claim 13 wherein said resource controller further comprises means for withholding a subsequent bus grant for initiation of a subsequent memory operation for any said memory unit until the previously initiated memory operation for the respective said memory unit has been completed.

15. The improvement of claim 14 further comprised of a high speed look-ahead cache memory for each said memory unit, each said look-ahead cache memory being coupled to said bus and said direct memory access unit, said direct memory access unit being a means for accessing one said memory unit and loading a plurality of look-ahead instructions into a respective said cache memory when granted bus access.

16. The improvement of claim 15 wherein said plurality of units includes a plurality of processor units.

17. The improvement of claim 16 wherein said resource controller including means for granting bus requests in the order of the priority of the requesting unit.

18. The improvement of claim 17 wherein said plurality of units includes a plurality of memory units.

19. The improvement of claim 12 wherein said bus is further comprised of at least one read/write line, whereby a unit gaining control of the bus may identify the nature of the memory operation to be carried out by the signal applied to said at least one read/write line.

20. In a computer system, the improvement comprising a time-shared bidirectional multiplexed bus, said bus having a first plurality of lines for carrying addresses, instructions and data in a time division multiplexed operation a plurality of units coupled in parallel to said bus for communication therebetween over said bus lines, said plurality of units including a plurality of processor units and at least one memory unit, each said processor unit having a relative priority in the system, each said processor unit further including request means for requesting access to aid bus for communication thereover to another specific unit coupled to said bus, each said memory unit having a predetermined access time associated with memory operations dependent upon the time within which memory read and write cycles will be completed by said memory units, and a resource controller, said resource controller being coupled each said processor and each said memory unit, said resource controller being responsive to bus access requests from each said process to grant bus access thereto in the order of the priority of the requesting processors for initiation of a memory operation with one said memory unit, said resource controller further having means for retaining said predetermined access time associated with each said memory unit to withhold a subsequent bus grant for initiation of a subsequent memory operation for any said memory unit until the respective said predetermined access time has expired since initiation of a prior memory operation; and wherein said time division multiplexing of said bus occurs during the time between placing an address on said bus and placing data associated with said address on said bus.

21. The improvement of claim 20 wherein said resource controller further comprises means for granting bus access for completion of a previously initiated memory operation after said predetermined access time for the particular said memory unit has expired.

22. The improvement of claim 21 wherein said resource controller further comprises means for withholding a subsequent bus grant for initiation of a subsequent memory operation for any said memory unit until the previously initiated memory operation for the respective said memory unit has been completed.

23. The improvement of claim 22 further comprised of a direct memory access unit coupled to said bus and said resource controller.

24. The improvement of claim 23 wherein said direct memory access unit includes request means for requesting access to said bus for communication thereover to a particular said memory unit, said direct memory access unit being a means for directly communicating with the particular said memory unit when given bus access by said resource controller.

25. The improvement of claim 24 wherein said direct memory access unit includes at least one port for communication with the outside world.

26. The improvement of claim 25 further comprised of a high speed look-ahead cache memory for each said memory unit, each said look-ahead cache memory being coupled to said bus and said direct memory access unit, said direct memory access unit being a means for accessing one said memory unit and loading a plurality of look-ahead instructions into a respective said cache memory when granted bus access.

27. The improvement of claim 26 wherein said bus is further comprised of a read/write line, whereby a unit gaining control of the bus may identify the nature of the memory operation to be carried out by the signal applied to said read/write line.

28. In a computer system the improvement comprising a time-shared bidirectional multiplexed bus, said bus having a first plurality of lines for carrying addresses, instructions and data in a time division multiplexed operation utilizing a continuous stream of fixed duration time slots, whereby an address, an instruction or data may be transmitted on the bus during any one time slot a plurality of units coupled in parallel to said bus for communication therebetween over said bus lines, said plurality of units including a plurality of processor units and at least one memory unit, each said processor unit having a relative priority in the system, each said processor unit further including request means for requesting access to said bus for communication thereover to another specific unit coupled to said bus, each said memory unit having a predetermined access time associated with memory operations dependent upon the time within which memory read and write cycles will be completed by said memory units, said plurality of units also including a direct memory access unit, said direct memory access unit having request means for requesting access to said bus for communication thereover to a particular said memory unit, said direct memory access unit also having a relative priority in the system and being a means for directly communicating with the particular said memory unit when given bus access by a resource controller coupled to each said processor and each said memory unit, said resource controller being responsive to bus access requests from each said processor to grant bus access thereto in the order of the priority of the request for initiation of a memory operation with one said memory unit, said resource controller further having means for retaining said predetermined access times associated with each said memory unit to withhold a subsequent bus grant for initiation of a subsequent memory operation for any said memory unit until the respective said predetermined access time has expired since initiation of a prior memory operation wherein said time division multiplexing of said bus occurs during the time between placing an address on said bus and placing data associated with said address on said bus.

29. The improvement of claim 28 wherein said resource controller further comprises means for granting bus access for completion of a previously initiated memory operation after said predetermined access time for the particular said memory unit has expired.

30. The improvement of claim 29 wherein said resource controller further comprises means for withholding a subsequent bus grant for initiation of a subsequent memory operation for any said memory unit until the previously initiated memory operation for the respective said memory unit has been completed.

31. The improvement of claim 30 further comprised of a high speed look-ahead cache memory for each said memory unit, each said look-ahead cache memory being coupled to said bus and said direct memory access unit, said direct memory access unit being a means for accessing one said memory unit and loading a plurality of look-ahead instructions into a respective said cache memory when granted bus access.

* * * * *